(12) United States Patent
Rankin (10) Patent No.: US 7,954,374 B2
(45) Date of Patent: Jun. 7, 2011

(54) ESTIMATING THE CONSUMPTION OF A FLUID BY SENSING DISPLACEMENT OF A COUPLING DEVICE

(75) Inventor: William John Rankin, Burnsville, MN (US)

(73) Assignee: Colder Products Company, St. Paul, MN (US)

( * ) Notice: Subject to any disclaimer, the term of this patent is extended or adjusted under 35 U.S.C. 154(b) by 0 days.

(21) Appl. No.: 12/563,741

(22) Filed: Sep. 21, 2009

(65) Prior Publication Data

US 2010/0006162 A1    Jan. 14, 2010

Related U.S. Application Data

(62) Division of application No. 11/276,890, filed on Mar. 17, 2006, now abandoned.

(60) Provisional application No. 60/662,665, filed on Mar. 17, 2005.

(51) Int. Cl.
*G01F 23/00* (2006.01)
*G01F 23/20* (2006.01)

(52) U.S. Cl. .................... 73/290 R; 73/296
(58) Field of Classification Search .............. 73/296
See application file for complete search history.

(56) References Cited

U.S. PATENT DOCUMENTS

| | | | |
|---|---|---|---|
| 2,015,689 A | 10/1935 | Odell | |
| 2,720,784 A * | 10/1955 | Kelly | 73/290 R |
| 3,099,211 A | 7/1963 | Vernon, Jr. | |
| 4,213,021 A | 7/1980 | Alexander | |
| 4,241,769 A | 12/1980 | Wiesner | |
| 4,646,784 A | 3/1987 | de Leeuwe | |
| 5,014,798 A | 5/1991 | Glynn | |
| 5,040,699 A | 8/1991 | Gangemi | |
| 5,079,943 A | 1/1992 | Custer | |
| 5,187,498 A | 2/1993 | Burger | |
| 5,477,896 A | 12/1995 | Grifols Lucas | |
| 5,623,290 A * | 4/1997 | Iida et al. | 347/7 |
| 5,690,252 A | 11/1997 | Oleksiewicz | |
| 5,853,244 A | 12/1998 | Hoff et al. | |
| 5,896,898 A | 4/1999 | Crossdale | |
| 6,202,711 B1 | 3/2001 | Martucci | |
| 6,325,113 B1 | 12/2001 | Hathaway | |
| 6,667,444 B1 | 12/2003 | Armitage | |
| 2002/0145650 A1 * | 10/2002 | Pan et al. | 347/85 |
| 2002/0170731 A1 | 11/2002 | Garber | |

FOREIGN PATENT DOCUMENTS

| | | |
|---|---|---|
| EP | 0 517 172 A2 | 12/1992 |
| JP | 2000-304593 | 11/2000 |

* cited by examiner

*Primary Examiner* — Hezron Williams
*Assistant Examiner* — Nathaniel Kolb
(74) *Attorney, Agent, or Firm* — Merchant & Gould P.C.

(57) ABSTRACT

An assembly for estimating consumption of a fluid includes a coupling device enabling fluid flow, a carrier assembly slidingly coupled to the coupling device, a biasing mechanism positioned between the coupling device and the carrier assembly, and a displacement sensing mechanism including a sensor coupled to one of the coupling device and the carrier assembly, and a magnet coupled to the other of the coupling device and the carrier assembly. The displacement sensing mechanism is configured to sense a displacement of the magnet relative to the sensor due to coupling of a fluid source to the coupling device.

9 Claims, 10 Drawing Sheets

ESTIMATING THE CONSUMPTION OF A FLUID BY SENSING DISPLACEMENT OF A COUPLING DEVICE

RELATED APPLICATION

This application claims the benefit under 35 U.S.C. §119(e) of U.S. Patent Provisional Application Ser. No. 60/662,665 filed on Mar. 17, 2005, the entirety of which is hereby incorporated by reference.

BACKGROUND

The use of weight scales to meter consumable media is known and widely employed. For example, applications employing industrial inkjet printers to print billboard displays or other large printouts need to monitor the consumption of ink during printing. Being able to effectively monitor ink consumption enables print production to determine whether there is enough of a particular ink to create the next billboard or printout.

Weight scales, in the form of strain gauges linked with a controller, have been used to determine a remaining amount of ink or consumable. Other systems have required manually removing a container with a particular consumable such as ink, weighing the consumable separately, cleaning the container housing the consumable, and then reconnecting it to the dispensing device (e.g., the printer). Still other systems have employed off-the-shelf flow sensors to monitor consumption.

These systems, however, have their shortcomings and improvements may be made. In the example systems described, an excess of parts may exist that can require different fittings, resulting in a less uniform system. Further, previous systems may not provide effective automated and integrated mechanisms for metering use of consumable media. Safety of end users can be jeopardized, as additional handling of the consumables and their containers may be required. Furthermore, previous systems do not provide a mechanism to help regulate warranty-repair in the event end users or customers inadvertently or purposely refill consumable containers to continue dispensing. For fluid dispensing applications that dispense at low flows (e.g., inkjet printing), the systems cannot cost-effectively employ off-the-shelf flow sensors.

SUMMARY

According to one aspect, an assembly for estimating consumption of a fluid includes a coupling device enabling fluid flow, a carrier assembly slidingly coupled to the coupling device, a biasing mechanism positioned between the coupling device and the carrier assembly, and a displacement sensing mechanism including a sensor coupled to one of the coupling device and the carrier assembly, and a magnet coupled to the other of the coupling device and the carrier assembly. The displacement sensing mechanism is configured to sense a displacement of the magnet relative to the sensor due to coupling of a fluid source to the coupling device.

According to another aspect, a system for estimating consumption of a fluid includes a coupling device, a carrier assembly slidingly coupled to the coupling device, a biasing mechanism positioned between the coupling device and the carrier assembly, and a displacement sensing mechanism coupled to the carrier assembly. The system also includes a data communications module coupled to the carrier assembly. Subsequent to connecting a mating insert to the coupling device, a fluid from a fluid source is delivered through the coupling device, and the fluid source applies a load to the coupling device, and the displacement sensing mechanism is configured to sense a displacement of the coupling device relative to the carrier assembly due to the load associated with the fluid source. The data communications module is programmed to estimate a volume of fluid in the fluid source based on the displacement.

According to yet another aspect, a coupling device includes a magnet coupled to the coupling device, and a magnetic position sensor coupled to the coupling device and configured to sense an angle of magnetic flux of the magnet. The coupling device is programmed to estimate a connected or disconnected state of the coupling device relative to a mating coupling device based on the angle of the magnetic flux of the magnet measured by the magnetic position sensor.

According to another aspect, a method for estimating consumption of a fluid in a fluid source includes: coupling a carrier assembly and biasing mechanism to a coupling device; coupling an insert of the fluid source to the coupling device; sensing a displacement of the coupling device relative to the carrier assembly when the fluid source is coupled to the coupling device; and estimating a volume of a fluid in the fluid source based on the displacement.

These and other various advantages and features of novelty are pointed out in the following detailed description. Reference should also be made to the drawings in which there are illustrated and described specific embodiments.

DESCRIPTION OF THE DRAWINGS

Like reference numbers generally indicate corresponding elements in the Figures.

DETAILED DESCRIPTION

Figure 1:
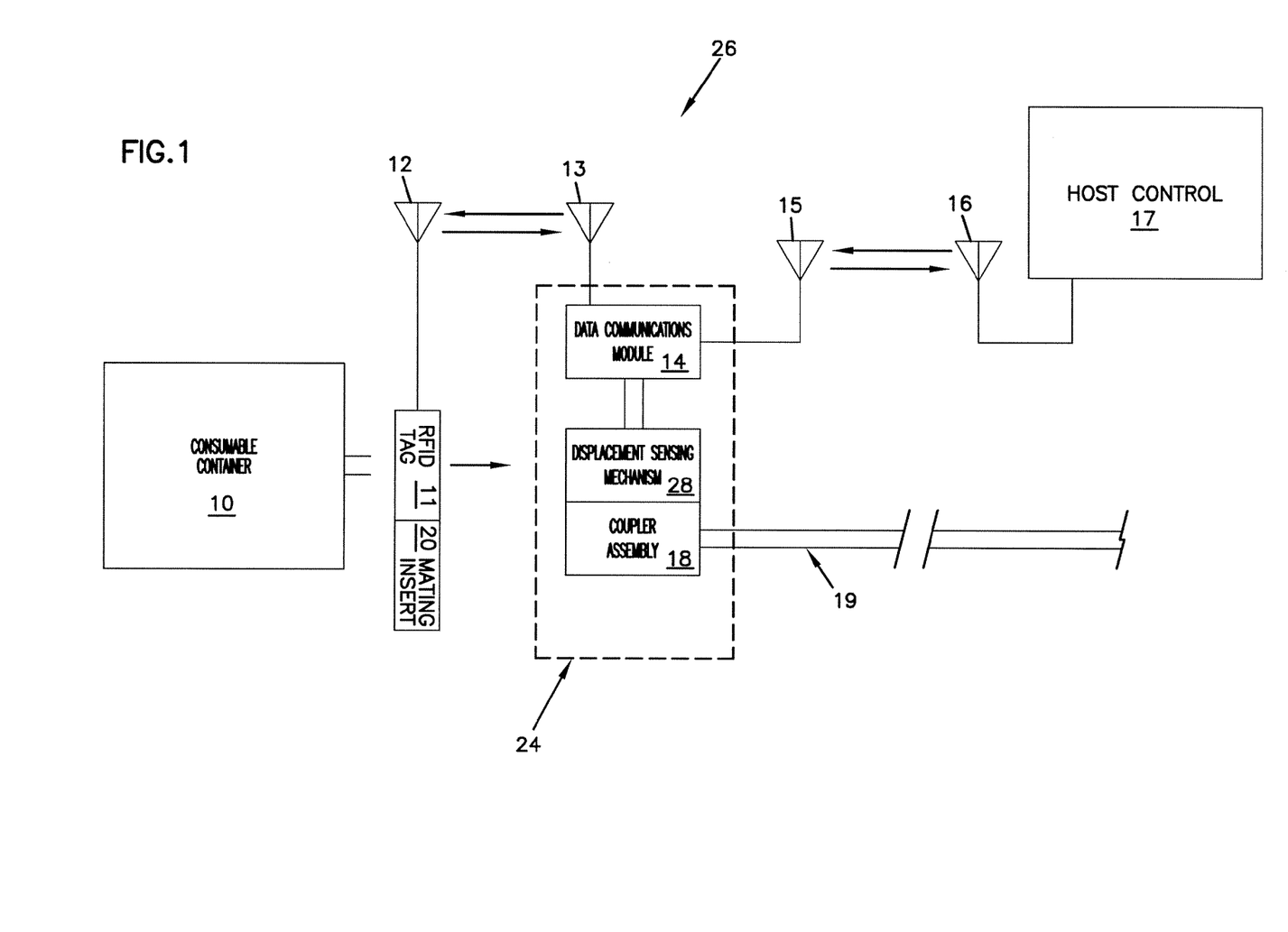
FIG. 1 is a schematic block diagram of an example embodiment of a system for metering consumption of fluid transfer material.
Figure 2:
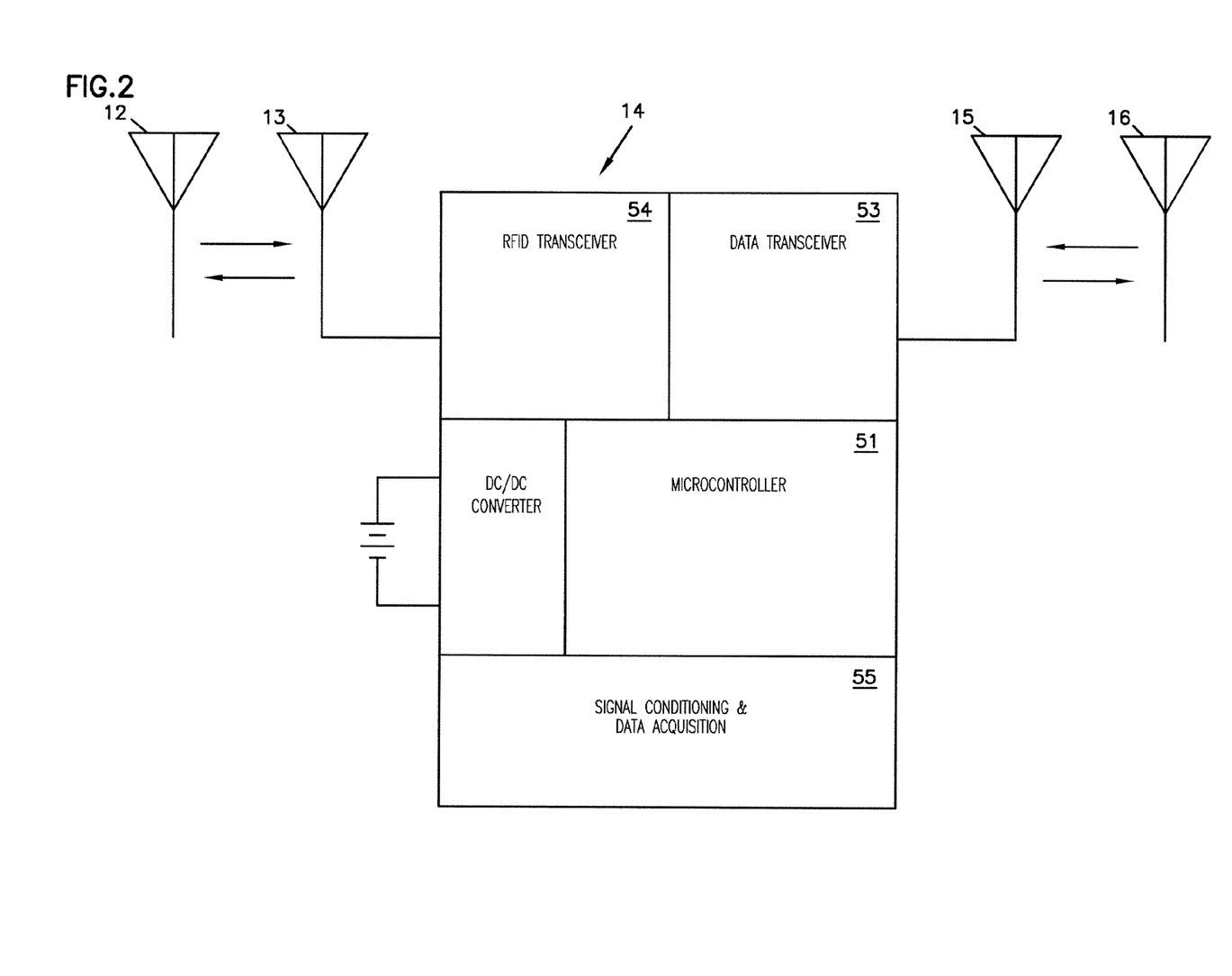
FIG. 2 is a schematic block diagram of one embodiment of a data communication module.

Referring to FIGS. 1 and 2, an example system 26 includes a consumable container 10 with an associated mating insert 20 and RFID tag 11. A weight sensing coupling assembly 24 is defined by a coupler assembly 18. Weight sensing coupling assembly 24 has a data communications module 14 and displacement sensing mechanism 28 associated therewith and is housed in a carrier assembly 61a (described further below).

In example embodiments, system 26 is configured to meter consumption of fluid transfer material. System 26 includes a host controller 17, which communicates via a data communications module 14 to the RFID tag 11. In the example shown, RFID tag 11 is attached to the insert 20. It will be appreciated that other arrangements may also be suitable. For example, in alternative embodiments, RFID tag 11 can be disposed directly on a fluid source, such as consumable container 10.

The data communications module 14 is attached to a coupler assembly 18. Data communication module 14 provides antenna or coil 13 to communicate wirelessly with antenna or coil 12 of RFID tag 11, and antenna or coil 15 to communicate with host controller 17. In the example embodiment shown in FIG. 1, data communications module 14 is operatively connected with a displacement sensing mechanism 28. In one embodiment shown in FIG. 3, the displacement sensing mechanism 28 includes a magnetic position sensor 22 positioned proximate to a magnet 64. Displacement sensing mechanism 28 is further discussed below.

In the example shown, coupler assembly 18 and mating insert 20 are disposable couplings known in the art. In some embodiments, these couplings are quick connect/disconnect couplings such as the couplings disclosed in U.S. Pat. No. 6,649,829 filed on May 21, 2002, which is hereby incorporated by reference.

RFID technology, including transponders and tags, utilizes data that is carried, retrieved, and transferred using an antenna and transceiver. Such tags are known to carry data which may provide identification for an item in manufacture or in transit, such as consumables in fluid dispensing applications, or any item that requires tracking or identification. Typically, an RFID system includes antenna or coil 13, an RFID transceiver 54, and a transponder or RFID tag 11. A radio signal emitted by the transceiver antenna 13 activates the RFID tag 11, allowing it to be read or written to. Antennas are available in a wide variety of shapes and sizes to suit specific applications. Coupling assemblies employing RFID tags and reader embedded therein have been disclosed in U.S. Pat. No. 6,649,829, U.S. patent application Ser. No. 11/233,939 filed on Sep. 22, 2005, and U.S. patent application Ser. No. 11/117,083 filed on Apr. 27, 2005, all of which are hereby incorporated by reference.

Figure 3:
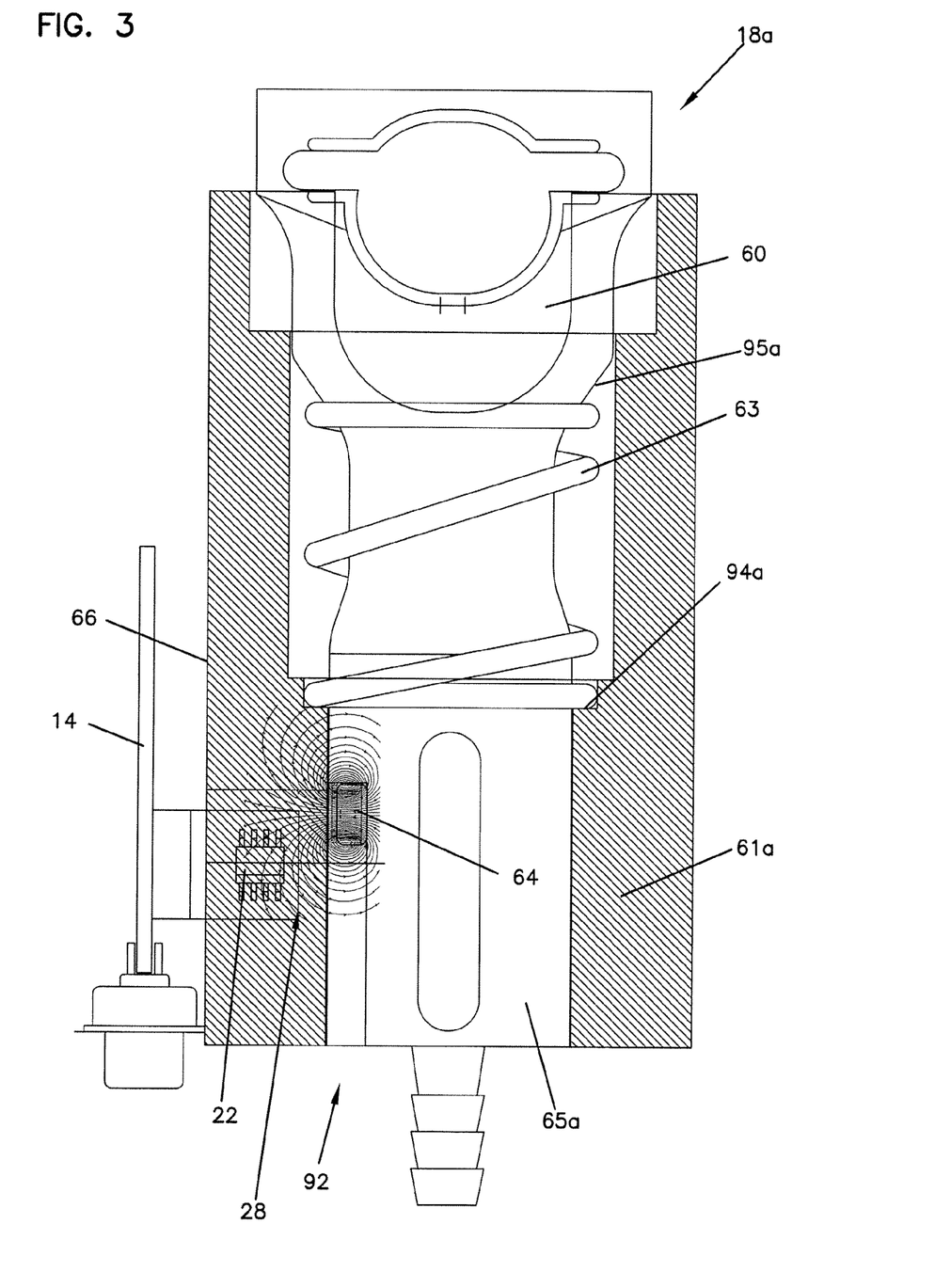
FIG. 3 is a partial cross-sectional view of an example embodiment of a weight sensing coupling assembly including one embodiment for a coupling device and a carrier assembly.
Figure 4:
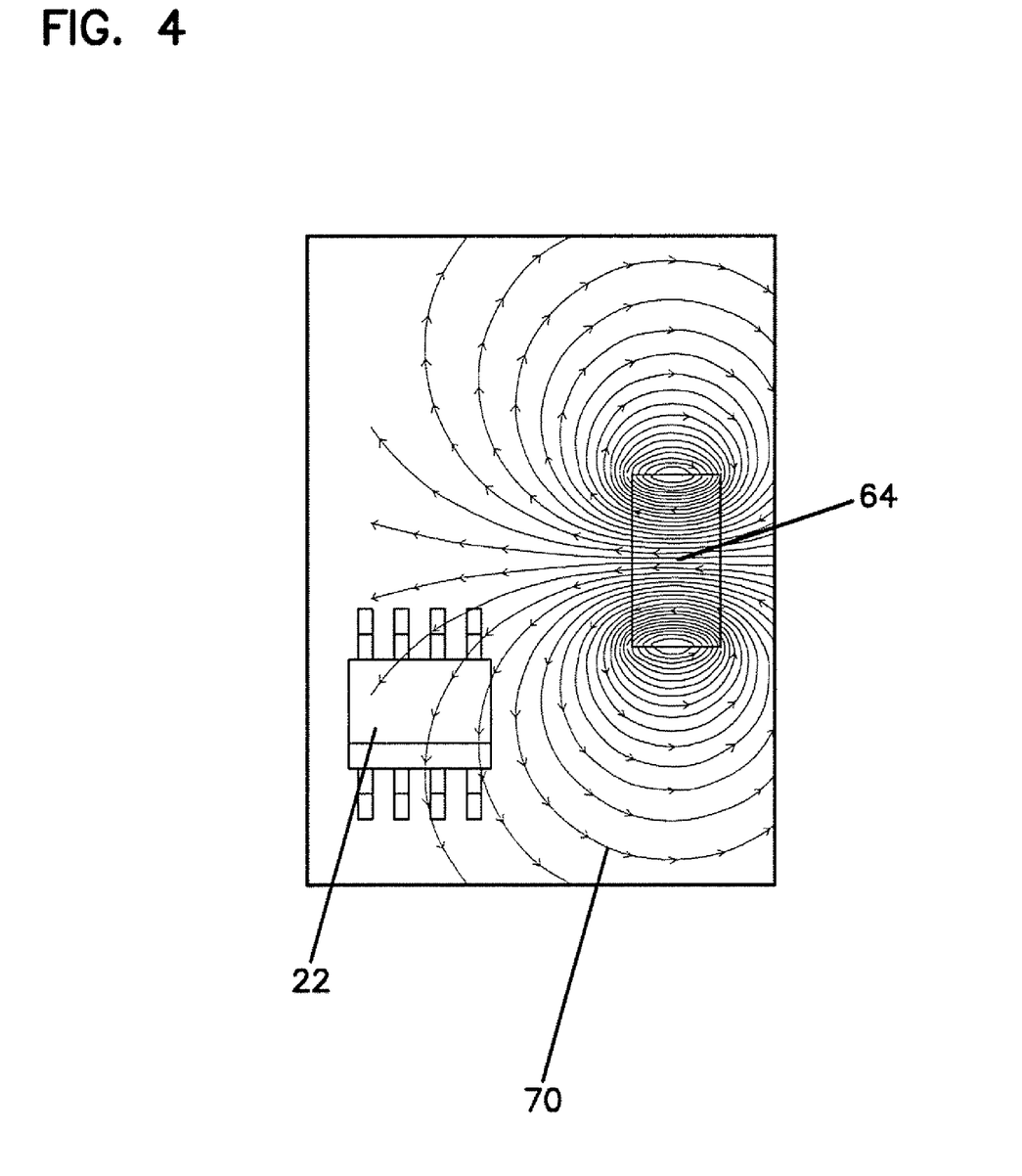
FIG. 4 illustrates an example magnetic flux angle of the magnet of FIG. 3 as measured by the magnetic position sensor of FIG. 3.

Referring to FIGS. 3 and 4, one embodiment of a weight sensing coupling assembly 24 is illustrated, in which a coupler assembly 18a is designed for a fixed or non-hanging application. In this configuration, a load applied to a coupling device 60, such as a consumable media from a container 10, pushes down on the coupling device 60. In the example embodiment, the displacement sensing mechanism 28 includes magnetic position sensor 22 and measures the displacement of a magnet 64 mounted on a carrier tail member 65a of coupling device 60. This disposition of the magnet 64 is an example, as other arrangements may also be equally suitable.

For example, magnet 64 may be disposed inside coupling device 60 and disposed within valved parts of the same. In such a configuration, the movement of the valving parts of coupling device 60 can indicate whether coupling device 60 is in an open or closed position, and can also indicate a connected or disconnected state relative to mating insert 20. Such a disposition of the magnet 64 can be utilized, for example, in fluid dispensing applications requiring high pressure, where certain thresholds can be determined to enable or disable fluid flow.

In the shown embodiment, magnetic position sensor 22 is embedded in the body of the carrier assembly 61a. It will be appreciated, however, that this disposition is an example, as other arrangements may be equally suitable. For example, magnetic position sensor 22 may also be disposed on any number of external or outer surfaces 66 of carrier assembly 61a or embedded in any number of positions therein.

Figure 5:
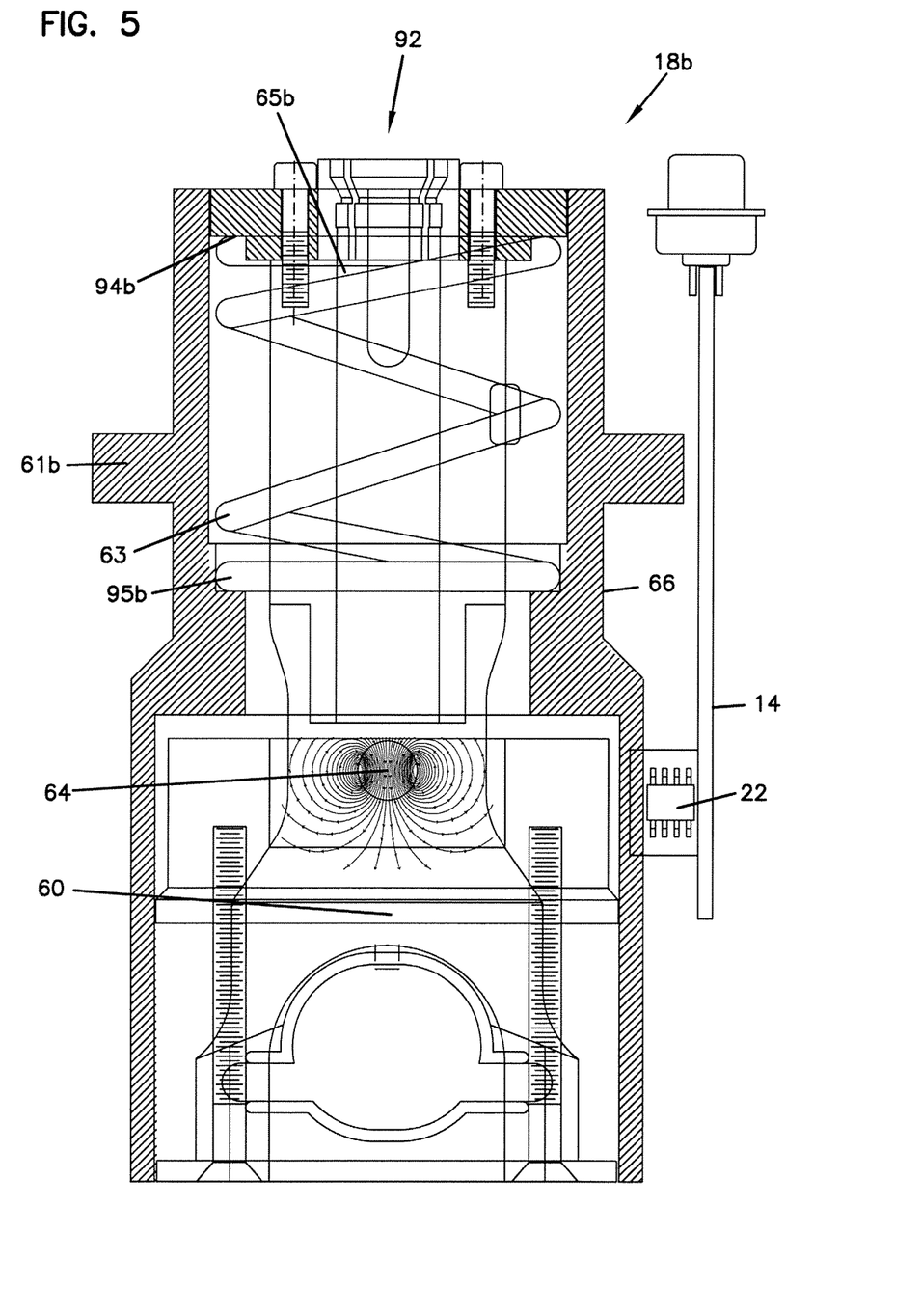
FIG. 5 is a partial cross-sectional view of another embodiment for a weight sensing coupling assembly including one embodiment of a coupling device and carrier assembly.

Referring to FIG. 5, another possible embodiment of a coupler assembly 18b including a carrier assembly 61b is illustrated, in which coupler assembly 18b is designed for a non-fixed or hanging application. In this configuration, a load applied to coupling device 60, such as a consumable media from a container 10, pulls down on coupling device 60. Magnetic position sensor 22 measures the displacement of a magnet 64 mounted on coupling device 60. This disposition of the magnet 64 is an example, as other arrangements may also be equally suitable. Similarly, in other embodiments, magnetic position sensor 22 can be arranged in other locations, such as on external surface 66 of the carrier assembly 61b.

In both the hanging and non-hanging embodiments, when a fluid source, such as consumable container 10, is coupled with the coupler assembly 18a, 18b, such as for fluid dispensing, the movement of coupling device 60 resulting from the weight of the container 10 is measured by magnetic position sensor 22. Magnetic position sensor 22 measures the changes in magnetic flux angle 70 of magnet 64 mounted either on coupling device 60 or carrier tail member 65b. As coupling device 60 moves in response to being coupled to a consumable container 10, mounted permanent magnet 64 moves in relation to magnetic position sensor 22.

In an example embodiment, the magnetic position sensor 22 is included as part of the data communications module 14 and can be mounted on outer 66 or inner surface of the carrier assembly 61a, 61b. In the illustrated embodiment, magnetic position sensor 22 is embedded within carrier assembly 61a, 61b. The relative movement of magnet 64 with respect to magnetic position sensor 22 results in a change of magnetic flux angle 70 at magnetic position sensor 22. Magnetic position sensor 22 outputs a voltage, proportional to magnetic flux angle 70, to a microcontroller or microprocessor 51 or like processing element.

Carrier assembly 61a, 61b enables displacement or movement of coupling device 60, along with carrier tail member 65a, 65b, and a biasing mechanism 63. Biasing mechanism 63 enables coupling device 60 to slidingly engage carrier assembly 61a, 61b and reciprocate within an opening of carrier assembly 61a, 61b. Carrier assembly 61a, 61b and carrier tail member 65a, 65b are discussed in further detail in FIGS. 7-10 below.

In one embodiment, biasing mechanism 63 is a coiled spring. In example embodiments, biasing mechanism 63 is chosen so that it does not approach its elastic limits or minimizes hysteresis. Thus, biasing mechanism 63 can repeatedly translate a force applied to a coupling device 60, such as from a load provided by a fluid material contained in a consumable container 10. Biasing mechanism 63 serves as a mounting means for coupling device 60.

In example embodiments, biasing mechanism 63 is chosen as a coiled spring having approximately 0.300 inches of deflection at a full load of 15 lbs. The size of biasing mechanism 63 is chosen to fit around a standard coupling device. In some embodiments, the material of biasing mechanism 63 is such that the biasing force may remain constant over an expected temperature range.

The spring depicted for biasing mechanism 63 is merely an example. Other biasing mechanisms may be employed that are equally suitable. For example, the biasing mechanism 63 may be a closed chamber of fluid that is compressible by a press or piston when a load is applied to coupling device 60. The pressure can be translated to a position or force sensor. The fluid, in turn, applies a force and presses on a plate of the position/force sensor mounted to the side of coupling device 60. The force may be divided by the ratio of area between coupling device 60 piston and a sensor plate. In such a configuration, the use of an incompressible fluid to couple the force to the force sensor develops a static pressure within the fluid when the piston presses on the fluid. The pressure exists in the complete volume of the fluid and, therefore, exerts pressure on the force sensor. In one embodiment, the fluid is completely confined in a chamber and there is negligible movement in the force sensor, therefore the fluid may be static when pressure is applied. Because the fluid is static and because there are no voids in the fluid, viscosity effects of the fluid may be removed. Thus, the amount of force exerted on the force sensor is proportional the ratio of the piston pressing on the fluid and the area of the sensor. A weight capacity of the scale can be tailored by changing the size of the force sensor.

In other examples of biasing mechanism 63, a pressure disk or donut may be employed, such as by filling the disk or donut with a flexible fluid or jell. The disk or donut may be compressed by a piston or the like and translate the force to a force sensor. Such a flexible disk can be made with a temperature resistant material. Furthermore, such a flexible disk can be formed to minimize air-bubbles so that an accurate force may be measured. It will be appreciated that these embodiments are examples and others may be equally suitable.

Figure 6:
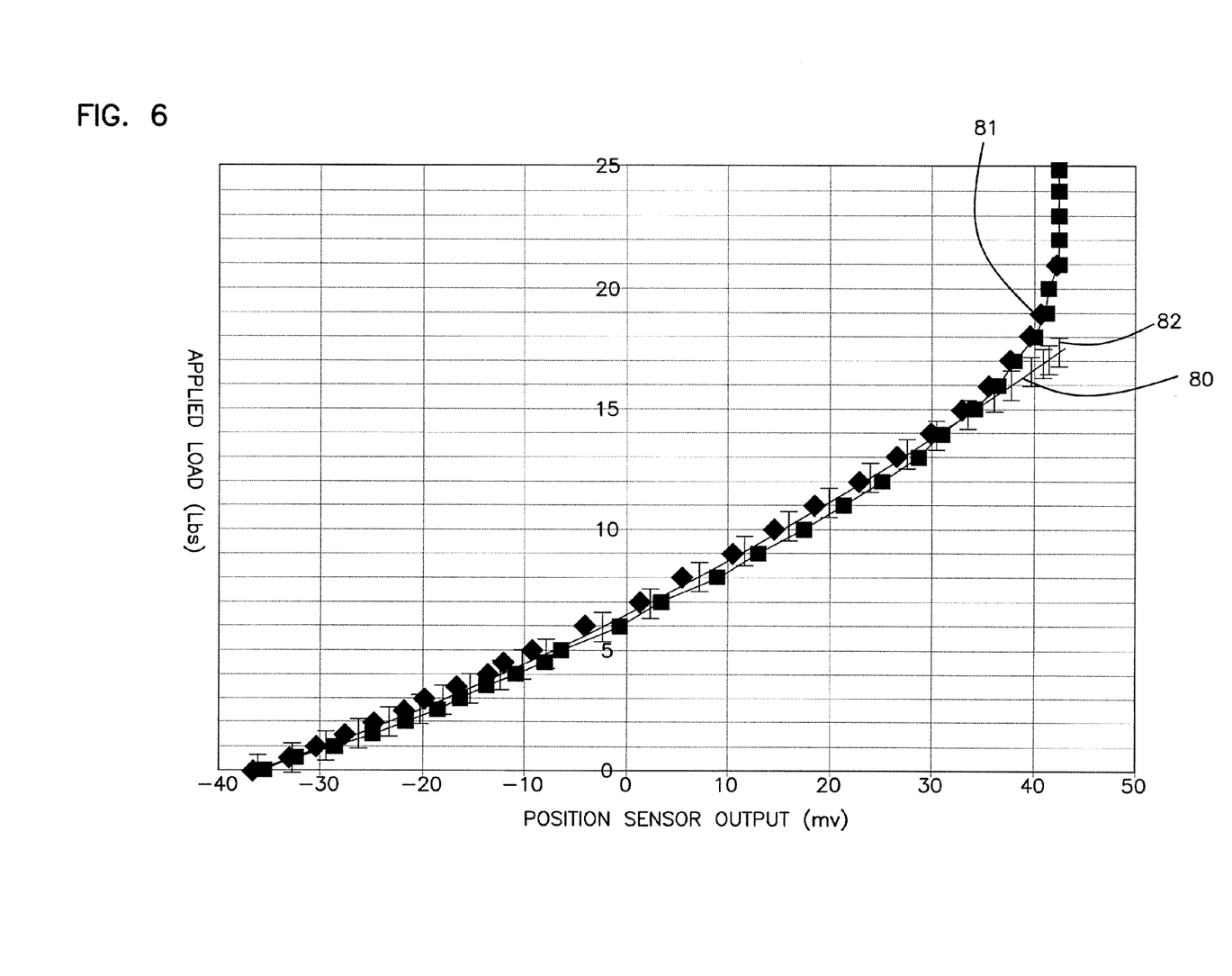
FIG. 6 is a graph showing the results of a sample experiment of recording magnetic position sensor output against a load applied to the carrier assembly.

Referring to FIG. 6, in one possible embodiment, microprocessor 51 calculates applied force 80, or the weight of consumable container 10, based on the voltage input from magnetic position sensor 22. Microprocessor 51 performs a polynomial curve fit, or transfer function (a), shown below. Transfer line 80, representing the calculated weight, is not linear. Flux angle 70 does not vary linearly with magnetic position sensor 22 displacement from an axis line of magnet 64. In one possible embodiment, the transfer function (a) is sufficiently accurate when approximated with a second order equation according to the following regression equation:

$$\text{Weight} = 9.98e-4*(X^2) + 0.214*X + 6.45 \quad (a)$$

It can be appreciated that, in other possible embodiments requiring a larger or smaller maximum weight threshold, a different transfer function may be used. In the typical embodiment, it is sufficient that the data points of actual load applied 81 fall within a +/−5% accuracy threshold 82 of the data points resulting from weight calculating transfer function 80. It will be appreciated that an accuracy rate may be as high as up to 2%.

Turning back to FIGS. 1 and 2, in one possible embodiment, calculated weight 80 is communicated to host controller 17 from the data communications module 14. Communication between host controller 17 and data communications module 14 of coupler assembly 18 is provided by a two-way serial interface. In the example embodiment, a RS-232 wireless protocol is used to communicate between antenna 16 of host controller 17 and antenna 15 of data communications module 14. Other possible embodiments include a data transceiver 53, which bidirectionally communicates using Bluetooth, IEEE 801.11, Zigbee wireless protocols, or RS-232, RS-485, Ethernet, or USB wired protocols. In another possible embodiment, a fiber optic cable is used. In wired embodiments, antennas 15 and 16 can be replaced with a wired connection.

In one possible embodiment, host controller 17 is connected, via wired or wireless means, to each data communications module 14 in a multi-coupler system. In another possible embodiment, host controller 17 is connected, via wired or wireless means, to one coupler in a multi-coupler system, wherein each coupling device is linked to another coupling device, forming a chain. A multi-drop protocol is known in the art and is implemented, for example, by using a RS-485 protocol.

In one possible embodiment, host controller 17 calculates the amount of remaining fluid in consumable container 10, based on a function of calculated weight 80 as received from data communication module 14, and subsequently writes fill level data to RFID tag 11 associated with the consumable container 10. In one possible embodiment, host controller 17 displays a "fuel gauge" type fill level on a control panel or screen. It will be appreciated that the metering system can further enable end users to run a dispensing system for a short time after an indication that a fluid material is low or empty.

In the example embodiment, host controller 17 writes data to RFID tag 11 memory by communicating the desired data to data communications module 14, by the method previously described, which, in-turn communicates the data via RFID transceiver 54 of data communications module 14 and antenna 13 to antenna 12 of RFID tag 11. The data is written to RFID tag 11 memory. In one possible embodiment, the data is written to RFID tag 11 to ensure that a user cannot add unapproved fluid to consumable container 10.

In one possible embodiment, memory of RFID tag 11 includes a 46-byte EEPROM for general-purpose use. It can be appreciated that other embodiments may use other types and sizes of memory for storing data specific to consumable container 10 to which the memory is attached.

In yet another possible embodiment, RFID tag 11 is attached directly to the consumable container 10, rather than to mating insert 20.

In one possible embodiment, the maximum weight of consumable container 10 is approximately 11 lbs. Readings of up to 4 times the maximum weight are possible due to initial impact upon connecting consumable container 10 to coupler assembly 18a, 18b. It can be appreciated that other embodiments can require a weight sensing coupling assembly that is adapted to support a larger or smaller maximum consumable container weight.

Sample Experiment

Referring back to FIG. 6, an example experiment was conducted in which the calculated weight 80 linearity, calibration, and transfer function (a) accuracy were tested. A force was applied to reader coupling device 60, representing the force resulting from the weight of consumable container 10 being coupled to coupler assembly 18a, 18b. Results were compared between weight calculated 80 by microcontroller 51, using the regression equation (a), based on a function of the voltage input from magnetic position sensor 22, and weight actually applied 81, as read by an electronic scale. Regression line 80 derived from the regression equation (a) fell within a +/−5% accuracy threshold 82 of actual data 81, throughout the useful range of magnetic position sensor 22. In this experiment, the maximum weight of consumable container 10 was approximately 11 lbs.

Figure 7A:
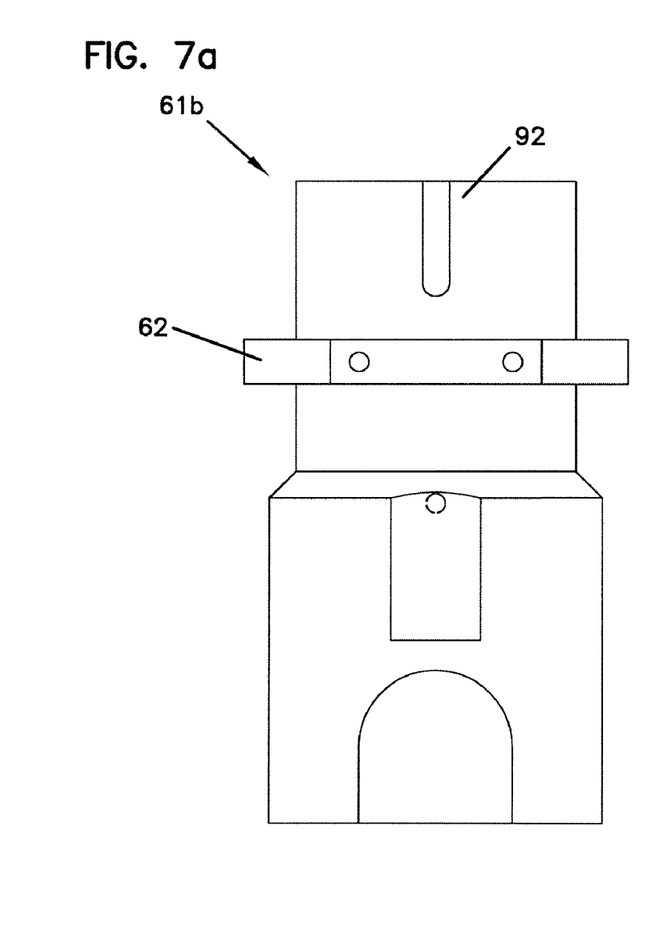
FIG. 7a is a side view of the housing for the carrier assembly shown in FIG. 5.
Figure 7B:
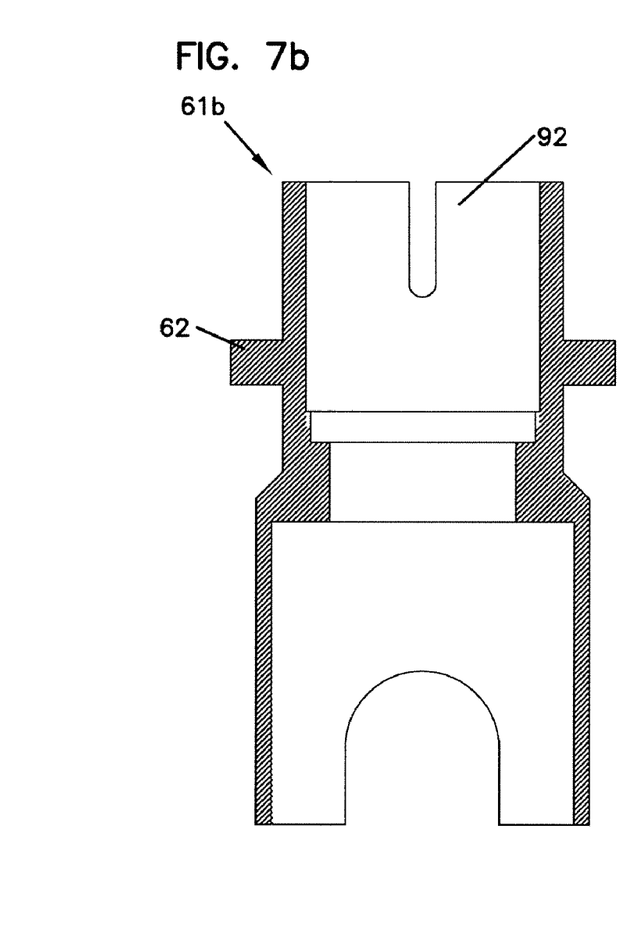
FIG. 7b is a partial cross-sectional view of the housing for the carrier assembly shown in FIG. 5.
Figure 8:
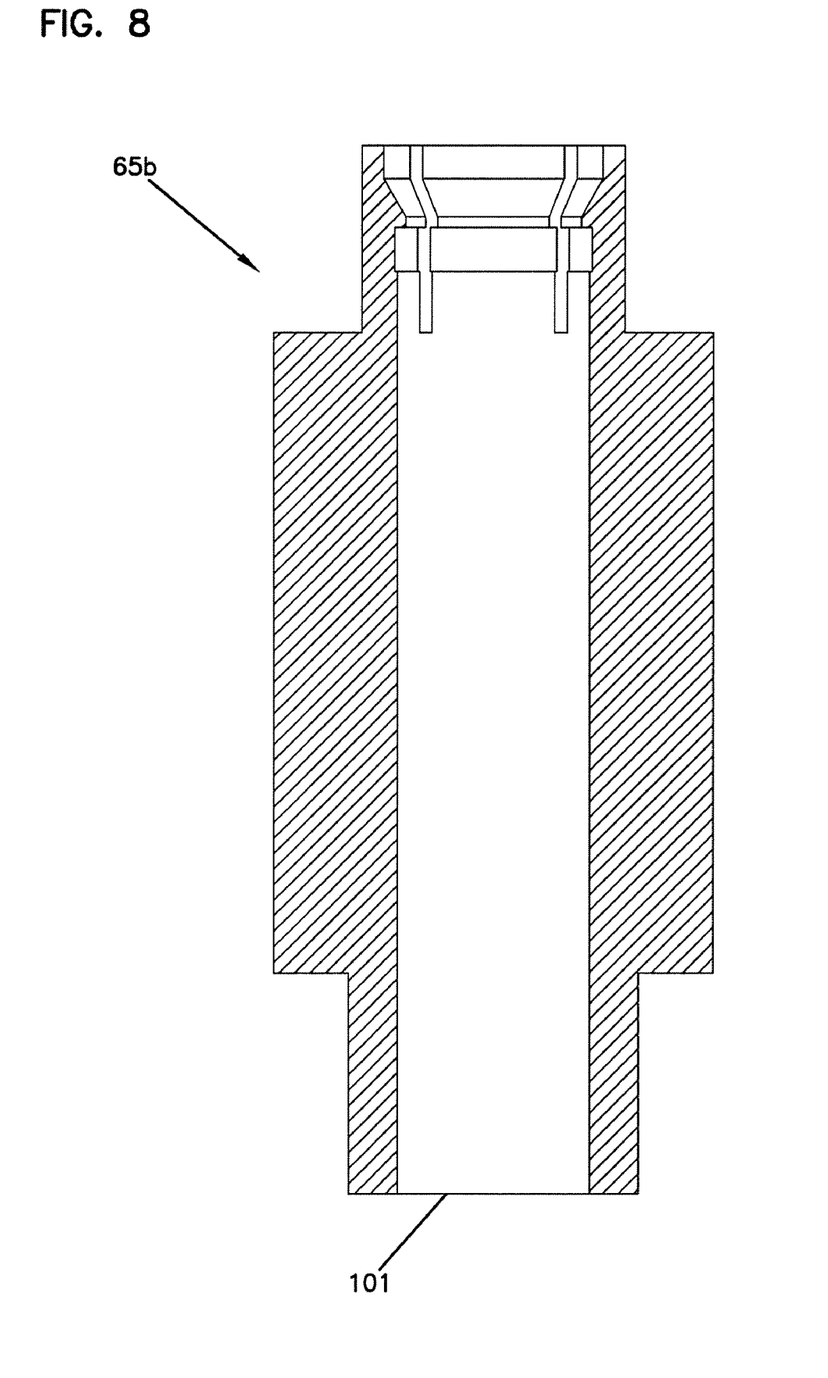
FIG. 8 is a partial cross-sectional view of a carrier tail for the carrier assembly shown in FIG. 5.

Referring to FIGS. 7a, 7b, and 8, one embodiment of a hanging weight sensing coupler housing 61b and tailpiece 65b are illustrated. A flange 62 is provided on an external surface of carrier assembly 61b, providing a means to hang the coupler assembly 18b.

Figure 9:
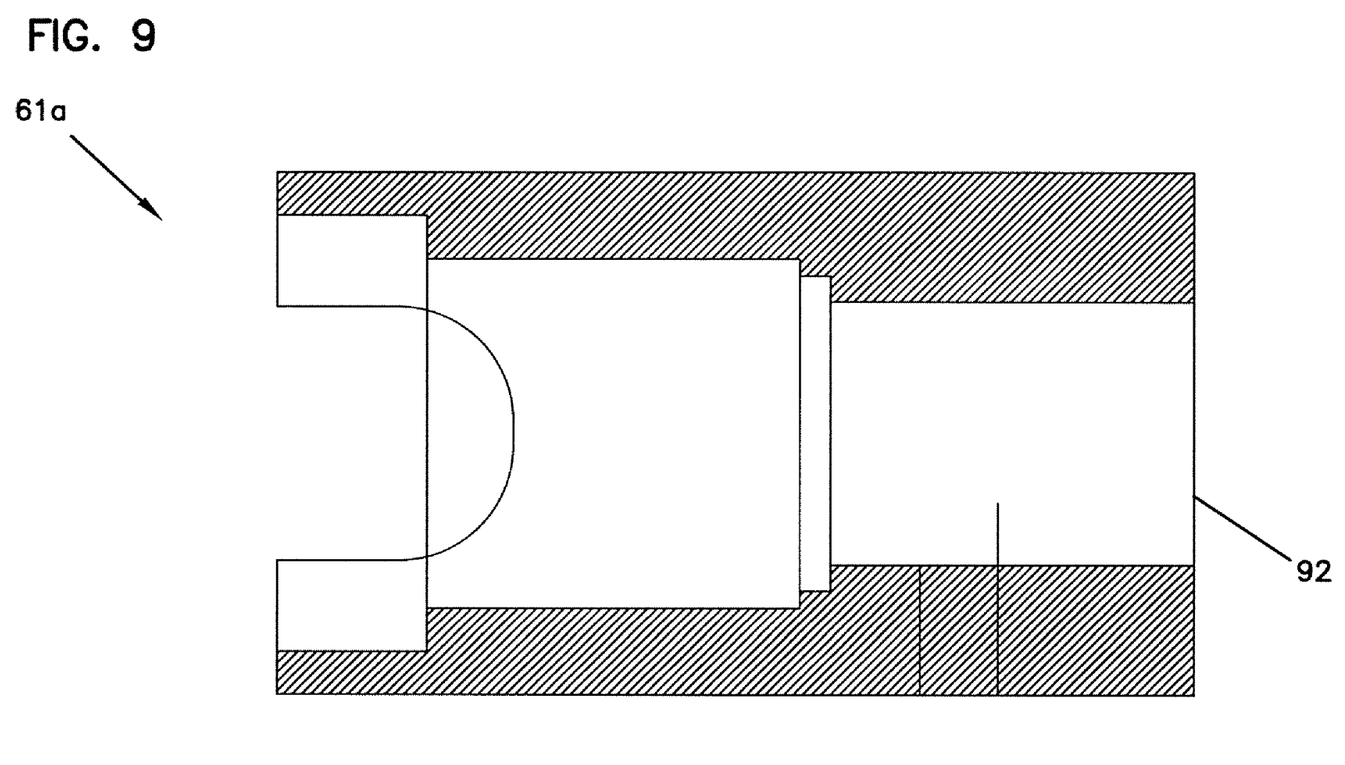
FIG. 9 is a partial cross-sectional view of the housing for the carrier assembly shown in FIG. 3.
Figure 10:
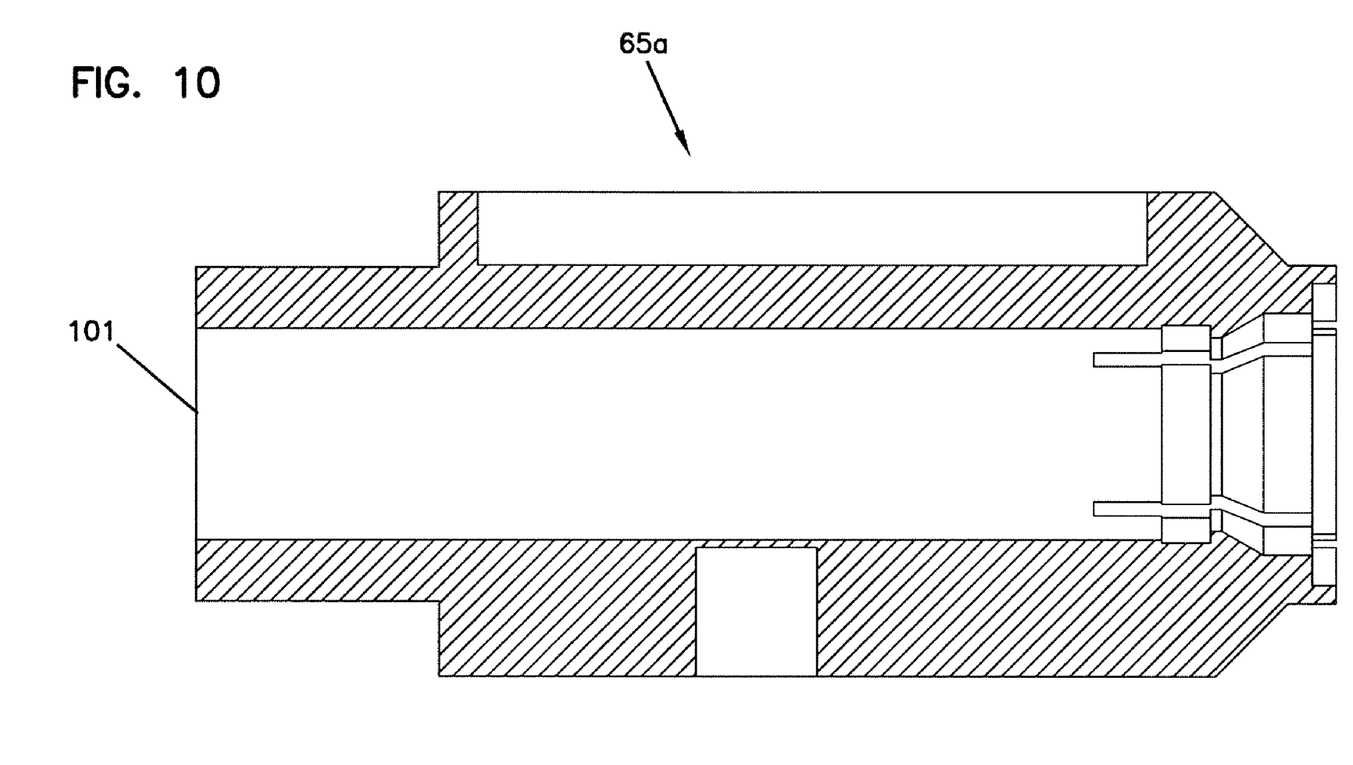
FIG. 10 is a partial cross-sectional view of the housing for the carrier assembly shown in FIG. 3.

Referring to FIGS. 9 and 10, one embodiment of a non-hanging weight sensing coupler housing 61a and tailpiece 65a are illustrated. Common to both hanging and non-hanging embodiments, an end of the carrier tail member 65a, 65b inserts into a first end 92 of carrier assembly 61a, 61b. The non-beveled edge or blunt end 101 is pressed into coupling device 60. Carrier tail member 65a, 65b may be connected via a press fit for the upright/non-hanging coupler assembly 18a. The carrier tail may be glued for the hanging coupler assembly 18b. It will be appreciated that these configurations are examples. Other examples for connecting carrier tail member 65a, 65b to coupling device 60 may be employed such as, but not limited to, ultrasonic bonding. Carrier tail member 65a, 65b provides an extended hose member connected at first end 92 of coupling device 60.

The metering system may operate as follows. Coupling device 60 is fitted with carrier assembly 61a, 61b including carrier tail member 65a, 65b and biasing mechanism 63. Referring to FIG. 3, in the non-hanging embodiment of coupler assembly 18a, biasing mechanism 63 resides between a shoulder portion 94a of carrier assembly 61a and a shoulder portion 95a of coupling device 60. Referring to FIG. 5, in the hanging embodiment of coupler assembly 18b, biasing mechanism 63 resides between a shoulder portion 94b and a second shoulder portion 95b of the carrier assembly 61b. In either embodiment, carrier tail 65a, 65b serves as a bearing surface and guide for biasing mechanism 63. Biasing mechanism 63 repeatedly translates a force applied to coupling device 60 into displacement, such as from a load applied to coupling device 60 that is provided by a fluid material contained in consumable container 10.

As fluid is transferred from consumable container 10 and through weight sensing coupling assembly 24, biasing mechanism 63 deflects as a force is applied to coupling device 60. The deflection is measured and communicated to microcontroller 51 of data communication module 14. The readings are scaled and translated to weight reading 80, representing the load applied to coupling device 60. Weight data 80 is subsequently used by host controller 17 to determine the amount of consumable or fluid transfer material remaining.

The displacement of coupling device 60 within carrier assembly 61a, 61b is measured using magnetic position sensor 22. Displacement of coupling device 60 is sensed by magnetic position sensor 22, which is mounted to a circuit board such as, but not limited to, data communication module 14. Magnetic position sensor 22 senses the angle of magnetic flux 70 produced by permanent magnet 64 that moves in relation to magnetic position sensor 22.

As the relative position of magnet 64 with respect to magnetic position sensor 22 changes, angle of magnetic flux 70 at magnetic position sensor 22 changes. Magnetic position sensor 22 yields a voltage that is proportional to angle of the magnetic flux 70. Magnetic position sensor 22 may be operatively connected to a microcontroller, such as microcontroller 51 of data communication module 14. Microcontroller 51 performs a transformation of the output of magnetic position sensor 22 to yield weight 80 of consumable container 10. Microcontroller 51 returns weight data 80 to host controller 17. The system employs a power supply, and is powered by 8-24 volts in example embodiments.

Coupling device 60 can be molded constructed and arranged as known in the art, for instance as in U.S. Pat. No. 6,649,829. Bearing carrier tail member 65a, 65b can be made of a molded plastic material and spin welded onto such a standard quick connect/disconnect coupling as known. Carrier tail member 65a, 65b can include an alignment key on an inner surface. However, in some embodiment, standard spin welding methods can allow for the alignment of welded tail member 65a, 65b within a degree.

In example embodiments, acetal is used for constructing coupling device 60 and carrier assembly 61a, 61b. Such a material is desired that can provide adequate bearing surfaces on coupling device 60. Further qualifying of the material for parts construction may be modified as desired, for instance, in any applications requiring specific chemical compatibility.

In example embodiments, system 26 is suitable for metering consumption of fluid in industrial inkjet printing applications. System 26 is also suitable for incorporation into any number of applications including but not limited to, bag-in-box and blow-molded fluid dispensing. Other applications may include chemical processing and measurement of reagents and/or chemical vats. Furthermore, measurement of pharmaceuticals, such as for dosage or other medical applications employing fluid dispensing, may also be employed. These are examples. It will be appreciated that the metering system 26 and weight sensing coupling assembly 24 may be employed in any number of applications for a fluid dispensing system.

The term "fluid" is used herein to denote any substance that may be made to flow. This includes, but is not limited to, liquids, gases, granular or powdered solids, mixtures or emulsions of two or more fluids, suspensions of solids within liquids or gases, etc.

The example systems disclosed herein can allow users to monitor how much fluid or other product material is connected to a weight sensing coupling assembly. The systems can allow customers to track the last known weight of a consumable container. The RFID tag enables periodic reading therefrom and writing thereto when communicating with a data communications module. Thus, the amount of remaining fluid in a consumable container can be periodically written to and read from the RFID tag. In this configuration, a consumable container can be tracked to determine if and when more fluid transfer material has been added to the consumable container. The systems disclosed herein can provide a means to notify the user or equipment manufacturer of inadvertent or purposeful introduction of additional material to the consumable container or fluid source, thereby controlling warranty repair.

The above specification provides a complete description of the composition, manufacture and use of the improved poppet valve member. Many embodiments can be made without departing from the spirit and scope of the disclosure.

What is claimed is:

1. A system for estimating consumption of a fluid, the system comprising:
   a coupling device;
   a carrier assembly slidingly coupled to the coupling device;
   a biasing mechanism positioned between the coupling device and the carrier assembly;
   a displacement sensing mechanism coupled to the carrier assembly; and
   a data communications module coupled to the carrier assembly;
   a fluid from a fluid source flows through the coupling device, and the fluid in the fluid source applies a load to the coupling device;
   wherein the displacement sensing mechanism is configured to sense a displacement of the coupling device relative to the carrier assembly due to the load associated with the fluid source; and wherein the data communications module is programmed to estimate a volume of fluid in the fluid source based on the displacement.

2. The system of claim 1, further comprising the fluid source containing the fluid.

3. The system of claim 2, further comprising the mating insert coupled to the fluid source.

4. The system of claim 1, wherein the displacement sensing mechanism includes:
   a magnetic position sensor coupled to the carrier assembly; and
   a magnet coupled to the coupling device;
   wherein the magnet moves with the coupling device, and the magnetic position sensor detects a displacement of the magnet.

5. The system of claim 4, wherein the data communications module includes a microcontroller, and the magnetic position sensor communicates the displacement of the magnet to the microcontroller, and the microcontroller is programmed to estimate the volume of the fluid in the fluid source based on the displacement of the magnet.

6. The system of claim 5, wherein the data communications module is programmed to communicate the volume of the fluid to a host controller, and the host controller is programmed to estimate a fill level of the fluid source based on the volume of the fluid.

7. The system of claim 6, wherein the data communications module writes the fill level of the fluid source to a data tag associated with the fluid source.

8. The system of claim 6, wherein the data communications module writes the fill level of the fluid source to a data tag coupled to the coupling device.

9. The system of claim 1, wherein the biasing mechanism is a spring.

* * * * *